(12) United States Patent
He (10) Patent No.: US 11,194,341 B2
(45) Date of Patent: Dec. 7, 2021

(54) AUTOMATED VEHICLE

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 213 days.

(21) Appl. No.: 16/572,648

(22) Filed: Sep. 17, 2019

(65) Prior Publication Data

US 2020/0159241 A1 May 21, 2020

Related U.S. Application Data

(60) Provisional application No. 62/769,047, filed on Nov. 19, 2018.

(51) Int. Cl.
| | |
|---|---|
| *B62D 21/00* | (2006.01) |
| *G05D 1/02* | (2020.01) |
| *B25J 9/00* | (2006.01) |
| *B25J 5/00* | (2006.01) |
| *B62D 61/00* | (2006.01) |
| *A47J 36/32* | (2006.01) |
| *A47J 44/00* | (2006.01) |
| *A47J 47/14* | (2006.01) |
| *G05B 19/416* | (2006.01) |
| *G06Q 30/06* | (2012.01) |
| *G06Q 50/12* | (2012.01) |

(52) U.S. Cl.
CPC ............ *G05D 1/0246* (2013.01); *A47J 36/32* (2013.01); *A47J 44/00* (2013.01); *A47J 47/14* (2013.01); *B25J 5/007* (2013.01); *B25J 9/0003* (2013.01); *B62D 61/00* (2013.01); *G05B 19/416* (2013.01); *G06Q 30/0633* (2013.01); *G06Q 50/12* (2013.01); *G05B 2219/2637* (2013.01); *G05B 2219/32029* (2013.01)

(58) Field of Classification Search
CPC ......... G05D 1/0246; A47J 36/32; A47J 44/00; A47J 47/14; B25J 9/0003; B25J 5/007; B62D 61/00; G05B 19/416; G05B 2219/2637; G05B 2219/32029; G06Q 30/0633; G06Q 50/12
USPC ......................................................... 180/21
See application file for complete search history.

(56) References Cited

U.S. PATENT DOCUMENTS

| | | | | |
|---|---|---|---|---|
| 5,213,176 | A | * | 5/1993 | Oroku .................. G05D 1/0231 180/168 |
| 2006/0175099 | A1 | * | 8/2006 | Jung ...................... B62D 7/026 180/6.48 |
| 2018/0194411 | A1 | * | 7/2018 | Liivik ....................... B60P 3/00 |
| 2019/0099894 | A1 | * | 4/2019 | Mimlitch, III ......... B25J 11/003 |
| 2019/0161132 | A1 | * | 5/2019 | Wiley .................... B62D 61/02 |
| 2020/0017152 | A1 | * | 1/2020 | Ishikawa ................ B62D 61/12 |

(Continued)

*Primary Examiner* — Toan C To (57) ABSTRACT

The present application discloses a vehicle. The vehicle comprises: a first support component and a second support component which may rotate relative to each other; a first drive wheel which is rotatable relative to the first support component; a second drive wheel which is rotatable relative to the second support component; a first universal wheel mounted on the first support component; and a second universal wheel mounted on the second support component. If the vehicle is placed on a horizontal floor and if both drive wheels touch the horizontal floor, then the axis of the first drive wheel and the axis of the second drive wheel may be contained or nearly contained in a vertical plane. The vehicle further comprises motors, sensors and a computer.

20 Claims, 10 Drawing Sheets

(56) References Cited

U.S. PATENT DOCUMENTS

2020/0160463 A1\* 5/2020 He .................. B25J 13/089
2021/0114226 A1\* 4/2021 Mei .................. B25J 11/008

\* cited by examiner

AUTOMATED VEHICLE

This application claims the benefit of U.S. Provisional Application Ser. No. 62/769,047 filed Nov. 19, 2018. The entire contents of the above application are incorporated herein by reference.

CROSS-REFERENCE TO RELATED APPLICATIONS

U.S. Provisional Application Ser. No. 62/769,047, Filed Nov. 19, 2018, Inventor: Zhengxu He.

BACKGROUND OF THE INVENTION

The present application relates to an automated vehicle that can move on a floor, a road or a terrain, etc. Our vehicle may optionally be used to carry a human. Our vehicle may also be used for delivery of an item to a customer. The delivered item can be food items within a restaurant, merchandise within a retail store, or an item from a business to a home, or an item from one building to another, etc. Our vehicle has a simple design and may travel on uneven roads. Our vehicle may make turns with a small radius and thus can avoid obstacles much better than traditional vehicles.

BRIEF SUMMARY OF THE INVENTION

Our vehicle may comprise one or more of the following: a first support component and a second support component which may rotate relative to each other; a pair of universal wheel devices which are respectively mounted on the first and second support component; a pair of drive wheels which are respectively mounted on the first and second support components; and a pair of motors each configured to produce a rotation of one of the drive wheels.

When the vehicle is placed on a horizontal floor, the axes of the drive wheels are configured to be on the same vertical plane, or nearly on the same vertical plane, and the vehicle further comprises a wheel on either side of the vertical plane. Also, the angle between the axis of the drive wheels and the axis of relative rotation of the first and support components is between 30 and 60 degrees (or ideally 45 degrees).

Our vehicle also comprises an orientation sensor; a proximity sensor; etc. The vehicle comprises a computer configured to connect to and/or to control the electrical or electronic devices on the vehicles.

These and other aspects, their implementations and other features are described in detail in the drawings, the description and the claims.

DETAILED DESCRIPTION OF THE INVENTION

For the present patent application, a motor comprises a powered mechanism configured to produce a relative motion between two members. A motor may be of different type depending on power source, e.g., electric, hydraulic, pneumatic, combustible. A computer may be configured to control a motor, e.g. to control the timing, direction and speed of the motion.

For the purpose of the present patent application, the position of a rigid body is meant to include information of positions of all points on the rigid body. The position of the rigid body is changed if any point of the rigid body is moved.

The location of a wheel is meant to include the information on the position of the axis of the wheel, as well as the information on the location of the space occupied by the wheel. The location of the wheel is considered unchanged if the wheel is rotated around its own axis.

In many applications, a motor comprises a base component (e.g., a frame) which is a stationary member of the motor, and a shaft which is a moving member of the motor, so that the powered mechanism of the motor is configured to produce a rotation of the shaft relative to the base component around the axis of the shaft. However, it is not a requirement that a motor must comprise a shaft.

Similarly, an encoder may comprise a base component, and a shaft which is rotatable relative to the base component, where the encoder can detect the degree of rotation of the shaft relative to the base component, and then inform a computer of the degree by sending signals to the computer.

For the purpose of present patent application, the information on the position of an object includes the information on the positions of all points of the object.

For the purpose of present patent application, wireless signals may optionally be electromagnetic signals, optical signals, ultra-sound signals, or other types of wireless signals.

Figure 1:
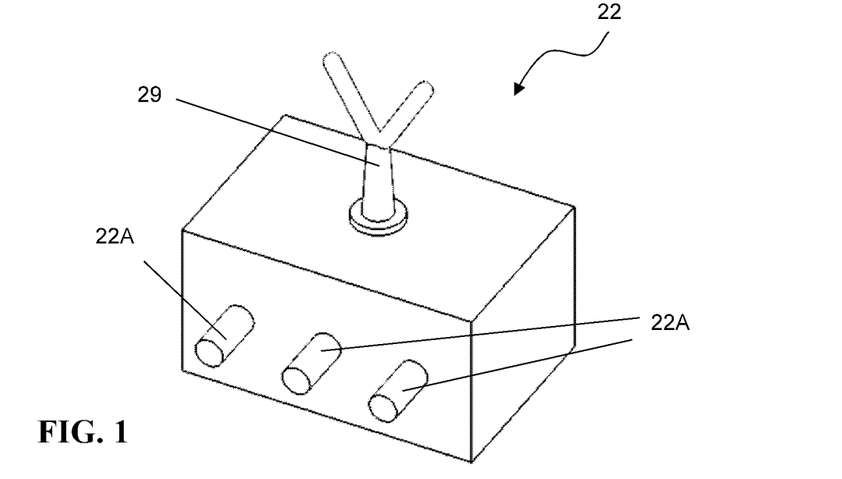
FIG. 1 shows an aerial view of a computer which comprises a plurality of input/output ports and a wireless communication device.

Referring to FIG. 1, a computer 22 comprises a plurality of input/output ports 22A. The input/output ports 22A of the computer 22 may be connected via wires to electronic or electric devices, such as radars, lidars, cameras, proximity sensors, orientation sensors, infrared sensors, and other sensors, etc. The input/output ports 22A of the computer 22 also may be connected to electrical or electronic devices such as motors. The computer 22 may control the operations of the electrical or electronic devices by sending signals to the electrical or electronic devices. The computer 22 further comprises a wireless communication device 29 configured to receive wireless signals from other computers, and to send wireless signals to other computers. The computer 22 further comprises hardware and software so that it can communicate with various electronic or electric devices via wireless communication through the wireless communication device 29. The computer 22 further comprises memory configured to store data or information.

The computer 22 may comprise a programmable logic controller, or in short, PLC. Alternatively, the computer 22 may comprise a microcontroller, a computer with an embedded system, or a circuit board comprising a microcomputer and a plurality of electronic or electric components.

It should be noted that the wireless signals sent by the computer 22 of FIG. 1 to other computers may be radio, WIFI, mobile, Bluetooth, or other wireless signals.

Figure 2:
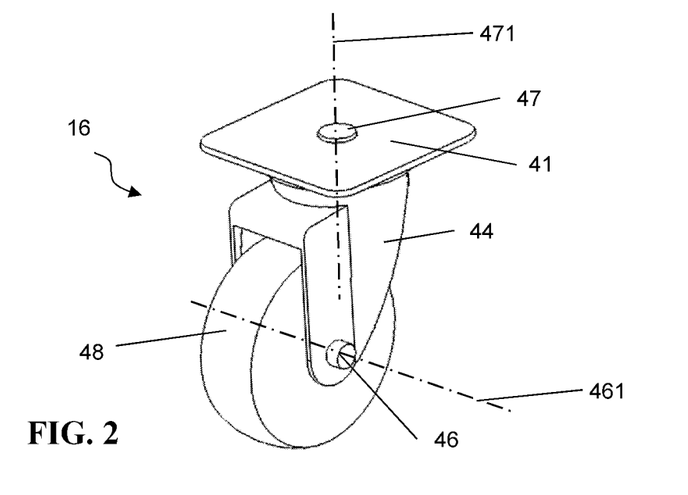
FIG. 2 shows an aerial view of a universal wheel device.

Referring to FIG. 2, a universal wheel device 16 comprises: shafts 46 and 47; a rigid component 44; a wheel 48; and a rigid component 41. The axis 461 of the shaft 46 is configured to be perpendicular to the axis 471 of the shaft 47. The axes 461 and 471 are not coplanar, i.e., the axes do not intersect in space. Please note that an axis is meant to be an infinite line in space without an end. The rigid component 44 is rigidly connected to the shaft 47. The shaft 47 is constrained to rotate relative to the rigid component 41 around the axis 471. Hence, the rigid component 44 is constrained to rotate relative to the rigid component 41 around the axis 471. The wheel 48 is configured to be fixedly connected to (and concentric with) the shaft 46. The wheel 48 is constrained to rotate relative to the rigid component 44 around the axis 461.

The rigid component 44 is also referred to as a rotatable component of the universal wheel device 16.

Figure 3A:
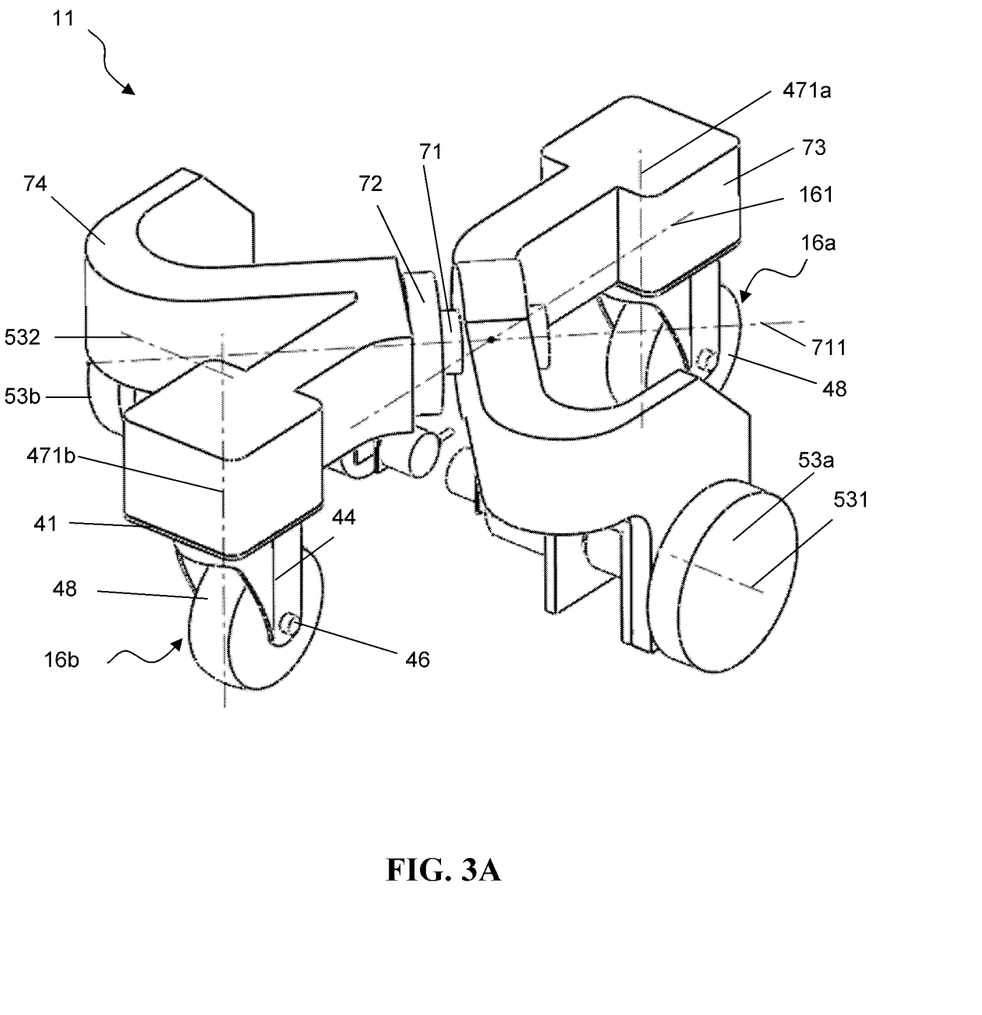
FIGS. 3A-3B show aerial views of a moving apparatus.
Figure 3B:
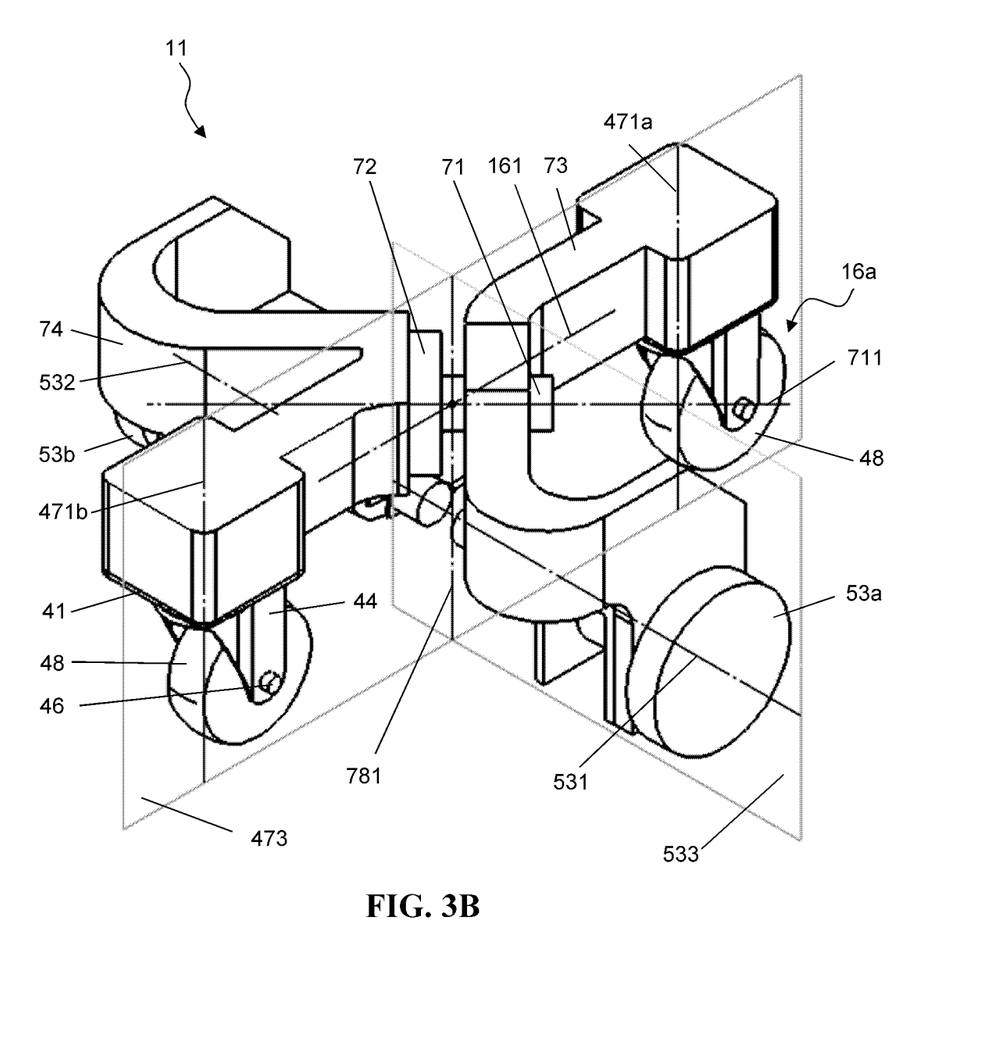
Figure 3C:
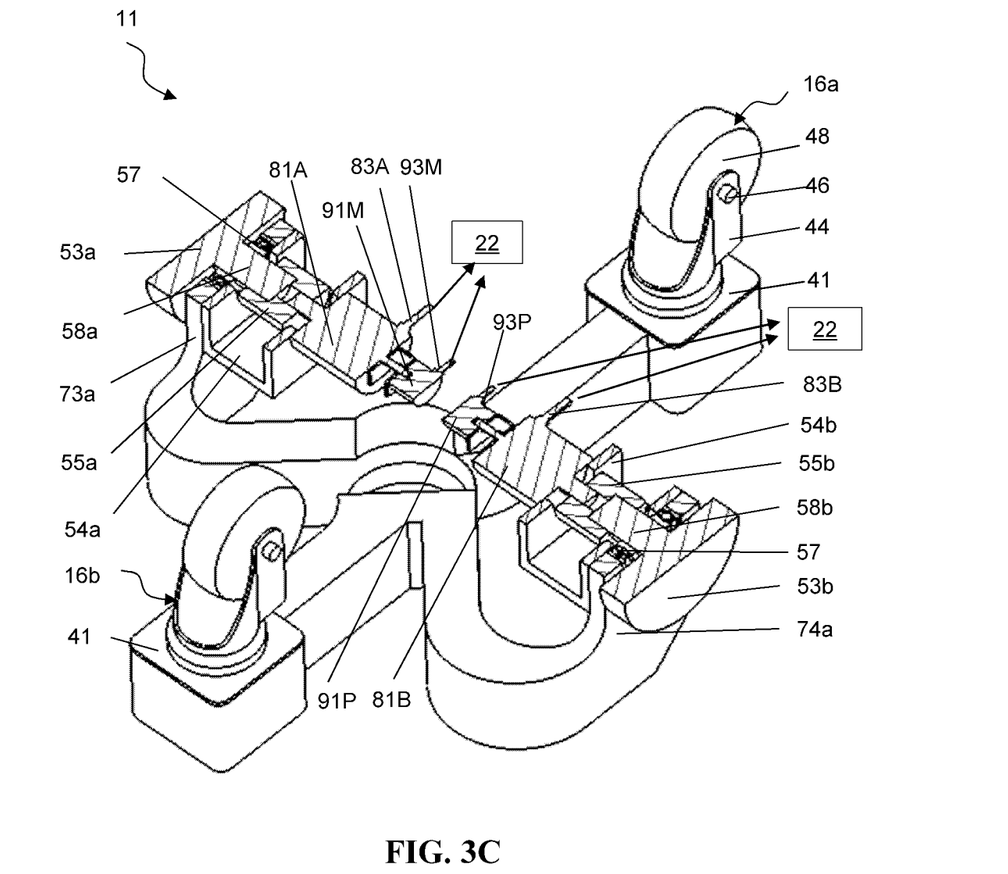
FIG. 3C shows a cutaway view of the moving apparatus.

Referring to FIGS. 3A-3C, a moving apparatus 11 comprises: a first universal wheel device 16a which is a copy of the universal wheel device 16 with the same parts and same part numbers; a second universal wheel device 16b which is also a copy of the universal wheel device 16 with the same parts and same part numbers; a first support component 73 which is a rigid component which is rigidly connected to a bearing housing 73a; and a second support component 74 which is rigidly connected to a bearing housing 74a. The axis of the shaft 47 of the first universal wheel device 16a will be denoted by 471a. The axis of the shaft 47 of the second universal wheel device 16b will be denoted by 471b. The rigid component 41 of the first universal wheel device 16a is rigidly connected to the first support component 73, so that the rotatable component 44 of the first universal wheel device 16a is constrained to rotate relative to the first support component 73 around the axis 471a of the shaft 47. Similarly, the rigid component 41 of the second universal wheel device 16b is rigidly connected to the second support component 74, so that the rotatable component 44 of the second universal wheel device 16b is constrained to rotate relative to the second support component 74 around the axis 471b of the shaft 47 of the second universal wheel device 16b.

The first support component 73 is rigidly connected to a shaft 71, which comprises an axis 711. The second support component 74 is rigidly connected to a bearing housing 72. Some bearings (hidden in the figures) are configured to connect the shaft 71 and the bearing housing 72 so that the first support component 73 is constrained to rotate relative to the second support component 74 around the axis 711 of the shaft 71.

The moving apparatus 11 further comprises: a first drive wheel 53a and a second drive wheel 53b; two shafts 58a and 58b; a first motor 81A and a second motor 81B, wherein each motor comprises a base component and a shaft. The wheel 53a comprises an axis 531; the wheel 53b comprises an axis 532. The first drive wheel 53a is rigidly connected to the shaft 58a and the axis 531 of the first drive wheel 53a is configured to coincide with the axis of the shaft 58a. A bearing 57 is configured to connect the shaft 58a to the bearing housing 73a, so that the shaft 58a is constrained to rotate relative to the first support component 73 around the axis 531. Hence, the first drive wheel 53a is constrained to rotate relative to the first support component 73 around the axis 531. Similarly, the second drive wheel 53b is rigidly connected to the shaft 58b, and the axis 532 of the second drive wheel 53b is configured to coincide with the axis of the shaft 58b. Another bearing 57 is configured to connect the shaft 58b to the bearing housing 74a, so that the shaft 58b is constrained to rotate relative to the second support component 74 around the axis 532. Hence, the second drive wheel 53b is constrained to rotate relative to the second support component 74 around the axis 532. The base component of the first motor 81A is fixedly connected to the first support component 73 via a connector 54a, and the shaft of the first motor 81A is fixedly connected to the shaft 58a via a coupling 55a. Thus, the first motor 81A may drive a rotation of the shaft 58a and the first drive wheel 53a relative to the first support component 73 around the axis 531. The base component of the second motor 81B is fixedly connected to the second support component 74 via a connector 54b, and the shaft of the second motor 81B is fixedly connected to the shaft 58b via a coupling 55b. Thus, the second motor 81B may drive a rotation of the shaft 58b and the second drive wheel 53b relative to the second support component 74 around the axis 532.

The moving apparatus 11 further comprises a first encoder 91M and a second encoder 91P each of which comprises a base component. The base component of the first encoder 91M is fixedly connected to the base component of the first motor 81A, and the first encoder 91M is configured to detect the angle change in the rotation produced by the first motor 81A. The base component of the second encoder 91P is fixedly connected to base component of the second motor 81B and the second encoder 91P is configured to detect the angle change in the rotation produced by the second motor 81B.

The moving apparatus 11 is further configured so that if the moving apparatus 11 is placed on a horizontal floor such that all four wheels 53a, 53b, 48 and 48 touch the floor (see FIGS. 3A-3B), then:

(1) the axis 531 of the first drive wheel 53a and the axis 532 of the second drive wheel 53b are horizontal and parallel to each other;

(2) the axis 531 is on a vertical plane 533;

(3) the axis 532 is on the vertical plane 533, or alternatively, the axis 532 is relatively near the vertical plane 533 in the sense that the distance from the axis to the vertical plane is relatively small, or more precisely, less than 15% of the distance between the first drive wheel and second drive wheel;

(4) the pair of wheels 48 do not intersect the vertical plane 533;

(5) the pair of wheels 48 are on opposite sides of the vertical plane 533;

(6) the axis 711 of the shaft 71 is horizontal;

(7) the axes of the wheels 48 are both horizontal;

(8) the axis 471a of the shaft 47 of the first universal wheel device 16a and the axis 471b of the shaft 47 of the second universal wheel device 16b are both vertical;

(9) the angle between the axis 711 and the axis 531 is between 30 and 60 degrees (or ideally 45 degrees);

(10) the angle between the axis 711 and the axis 532 is between 30 and 60 degrees (or ideally 45 degrees);

(11) the angle between the axis 711 and the vertical plane through the axes 471a and 471b is between 30 and 60 degrees (or ideally 45 degrees);

(12) the axis 471a of the shaft 47 of the first universal wheel device 16a and the axis 471b of the shaft 47 of the second universal wheel device 16b are both on a vertical plane, which is positioned in the middle between the first drive wheel 53a and the second drive wheel 53b;

and (13) the vertical plane which is halfway between the vertical axis 471a and the vertical axis 471b intersects the axis 531 at a point;

(14) the first drive wheel and the second drive wheel are on opposite sides of the vertical plane 473 which passes through the axes 471a and 471b;

(15) the angle between the vertical plane 533 and the vertical plane 473 is between 75 and 105 degrees (or ideally 90 degrees).

The moving apparatus 11 comprises an axis 781 which is well defined by the following conditions: (1) the axis 781 intersects the axis 711; (2) the axis 781 is parallel to the axis 471a; and (3) the angle between the axis 531 and the plane which passes through the axes 781 and 471a is 90 degrees. The axis 781 will be referred to as the central axis of the moving apparatus 11. The central axis of the moving apparatus 11 is moved together with the first support component 73 of the moving apparatus 11.

The moving apparatus 11 further comprises an axis 161 which intersects the central axis 781 at 90 degrees and which is perpendicular to the axis 531. Such an axis 161 will be referred to as the forward moving axis of the moving apparatus 11. If the moving apparatus 11 is placed on a horizontal floor, then the axis 161 is perpendicular to the axis 532 of the second drive wheel.

The radius of the first drive wheel 53a may optionally be configured to be equal to the radius of the second drive wheel 53b. If the moving apparatus 11 is placed on a horizontal floor, then the axis 531 of the first drive wheel 53a may be configured to coincide with the axis 532 of the second drive wheel 53b.

If the moving apparatus 11 is placed on a horizontal floor such that the four wheels 53a, 53b, 48 and 48 all touch the horizontal floor, and if the radii of the drive wheels 53a and 53b are the same, then the following will be true: when the first motor 81A and second motor 81B produce a synchronous speed in the first drive wheel 53a and the second drive wheel 53b, the moving apparatus 11 moves in the direction which is parallel to the forward moving axis 161 (if not counting slippage). When the first motor 81A and second motor 81B produce a different speed in the first drive wheel 53a and the second drive wheel 53b, the moving apparatus 11 may move along a curved path (if not counting slippage). When the first motor 81A and second motor 81B move in opposite directions but with same speed, the moving apparatus 11 may rotate around the central axis on the horizontal floor (if not counting slippage).

The moving apparatus 11 may move on a floor which is not flat. Then, the first support component 73 may rotate relative to the second support component 74, and this allows all four wheels to touch the floor. Moreover, some of the weight of the moving apparatus 11 is placed on each wheel.

The first motor 81A and the second motor 81B may optionally be stepper motors; but this is not a strict requirement. The angle of rotation by either motor may be monitored by a sensor, which is connected to the computer 22.

The first drive wheel 53a and the second drive wheel 53b may optionally be configured to be identical in size and shape. Moreover, the moving apparatus 11 may optionally be configured so that, if the moving apparatus 11 is placed on a horizontal floor such that the four wheels 53a, 53b, 48 and 48 all touch the horizontal floor, then: the central axis 781 is in the exact middle of the drive wheels 53a and 53b; the central axis 781 is in the exact middle of the axes 471a and 471b; and the distance between the drive wheels 53a and 53b is about equal to the distance between the axes 471a and 471b.

Figure 4A:
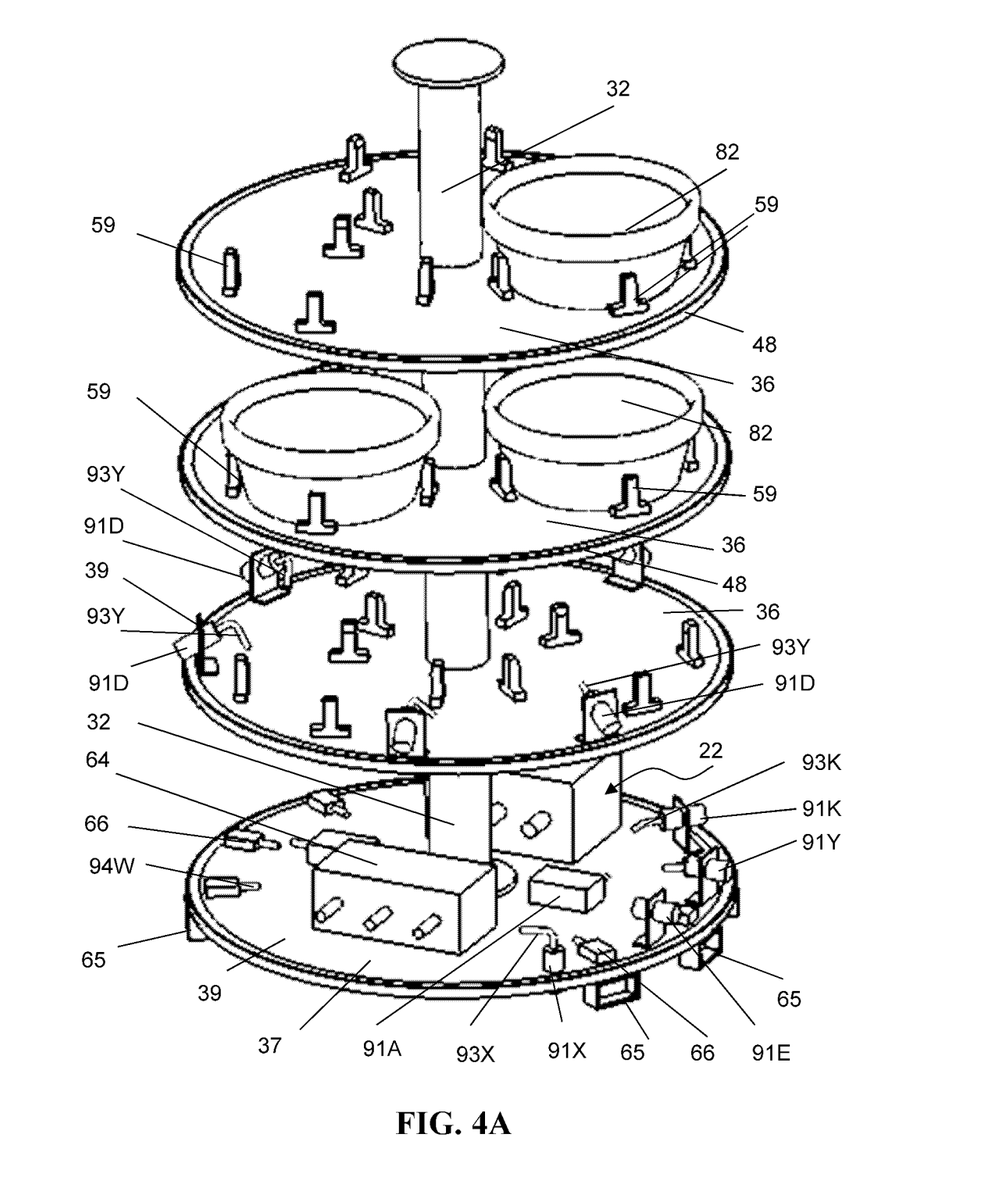
FIG. 4A shows an aerial view of a part of a vehicle body.
Figure 4B:
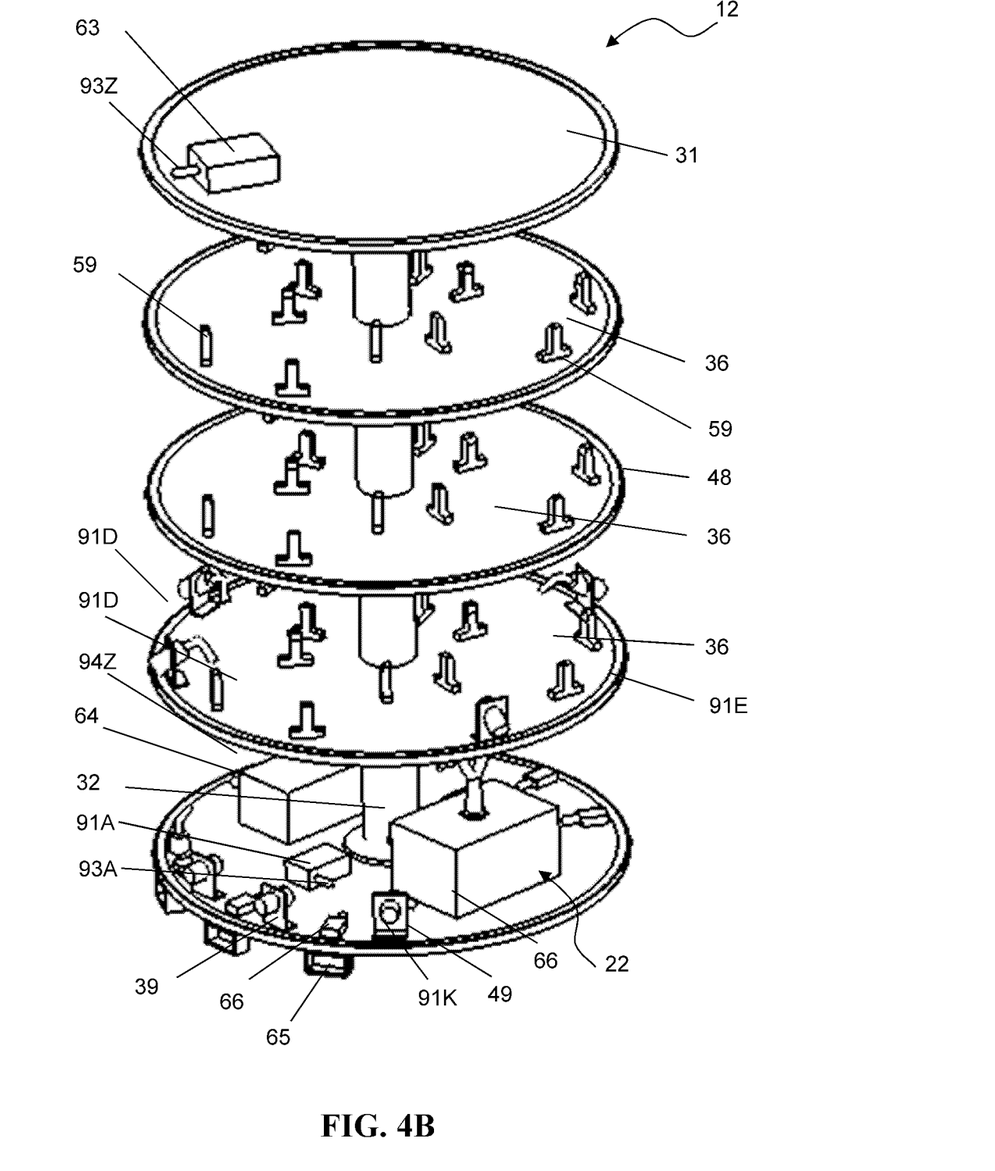
FIG. 4B shows an aerial view of the vehicle body.

Referring to FIGS. 4A-4B, a vehicle body 12 comprises: a support component 37 which is a flat board of round shape; a rigid component 32; flat boards 36 of round shape; an orientation sensor 91A, a computer 22, a proximity sensor 91K; an infrared sensor 91X; an ultrasonic sensor 91Y; cameras 91E; a rechargeable battery 64; a top board 31; and a display 63 on the top board 31. The proximity sensor 91K is configured to detect obstacles around the vehicle body 12. The infrared sensor 91X is configured to sense the distance of objects near the sensor; said sensor may be used as a proximity sensor to detect obstacles. The ultrasonic sensor 91Y is configured to sense the distance of objects near the sensor; said sensor may also be used as a proximity sensor to detect obstacles. The support component 37, the flat boards 36 and the top board 31 are configured to be rigidly connected by the rigid component 32. On each flat board 36, there are container holders 59 each configured to hold a container 82. The computer 22 comprises a wireless communication device 29 which can be used to communicate with other computers. The computer 22, sensors 91A, 91K, 91X and 91Y, cameras 91E, display 63, and rechargeable battery 64 are fixedly mounted on the components 31, 36 or 37. Each of the computer 22, sensors 91A, 91K, 91X and 91Y, cameras 91E, and display 63 comprises electric inlets configured to be connected to the electric outlets of the rechargeable battery 64. The orientation sensor 91A, the proximity sensor 91K, the infrared sensor 91X, the cameras 91E, and the display 63 are connected to the computer 22 via wires 93A, 93K, 93X, 93Y and 93Z respectively, to communicate with the computer 22.

The vehicle body 12 further comprises electric light sources 65 which are connected to the rechargeable battery 64 via switches 66, wherein each switch 66 is connected to the computer 22 so that the computer 22 may control the switch 66 to switch on or off. The electric light sources 65 are configured to emit beams of light in an area surrounding the vehicle 13, along the forward moving axis of the moving apparatus 11.

It should be noted that the information received by the computer 22 from various sensors may be sent to other computers.

It should be noted that the containers 82 are not part of the vehicle body 12.

Figure 5:
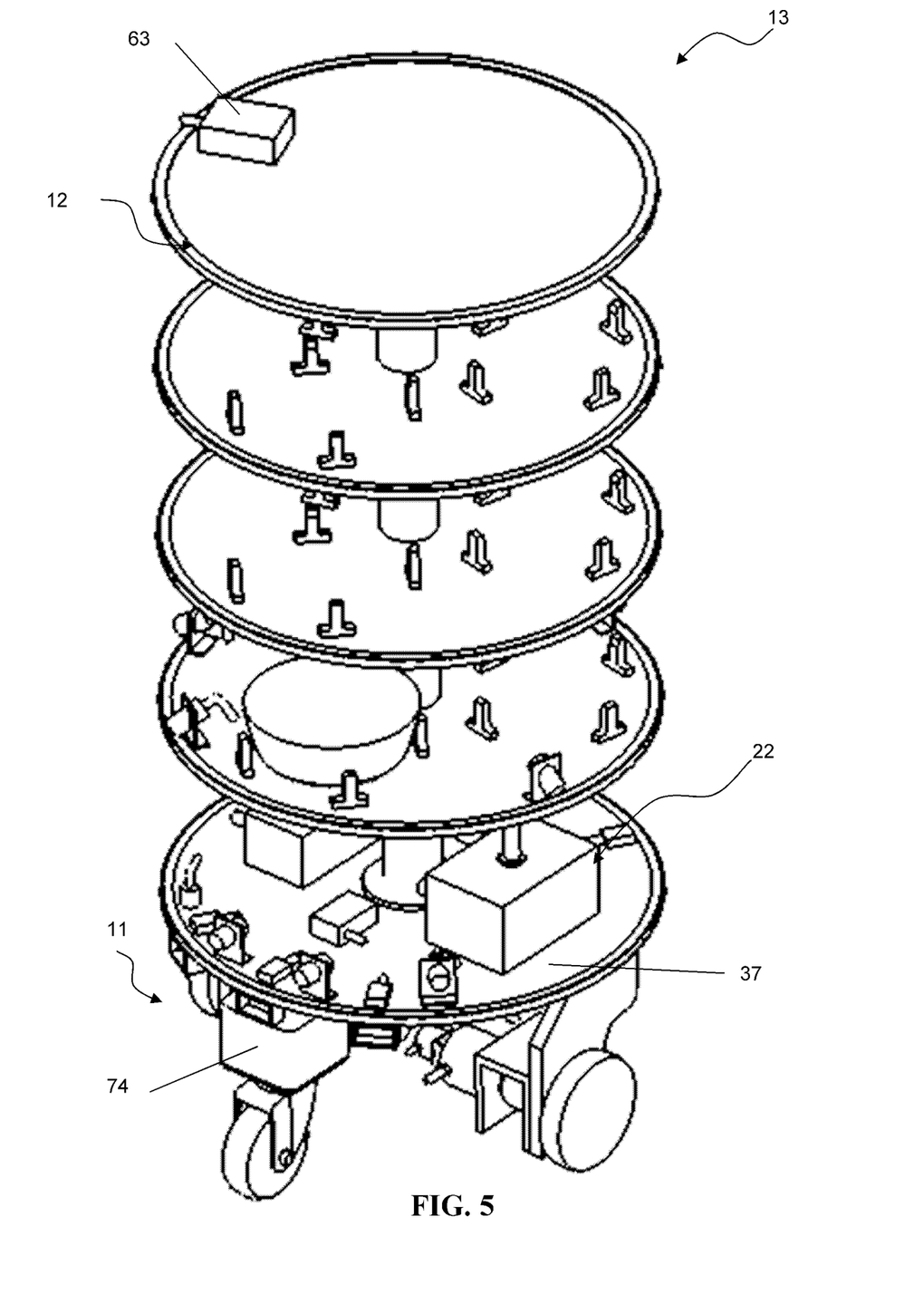
FIG. 5 shows an aerial view of a vehicle comprising the vehicle body.

Referring to FIG. 5, a vehicle 13 comprises the vehicle body 12 and the moving apparatus 11. The support component 37 of the vehicle body 12 is configured to be rigidly connected to the first support component 73 of the moving apparatus 11. The first motor 81A and the second motor 81B are connected to the computer 22 via wires 83A and 83B respectively. The computer 22 may send signals to dynamically control the timing and/or speed of the first motor 81A and second motor 81B. The first encoder 91M and the second encoder 91P of the moving apparatus 11 are connected to the computer 22 via wires 93M and 93P respectively. The encoders 91M and 91P are configured to send signals to the computer 22, so that the computer 22 can be informed of the angle change in the rotation produced by the first motor 81A and second motor 81B via the first encoder 91M and second encoder 91P respectively.

The moving apparatus 11 is configured to move on a floor of a building or structure, and the vehicle body 12 moves with the moving apparatus 11. The computer 22 may be informed of the angle change in the rotation produced by the first motor 81A and second motor 81B via the first encoder 91M and second encoder 91P respectively. The proximity sensor 91K is configured to detect obstacles in the next movement path of the vehicle 13 and then send electric and electronic signals to the computer 22. The infrared sensor 91X is configured to sense infrared radiation of surrounding objects near the vehicle 13 and then send electric and electronic signals to the computer 22. The orientation sensor 91A is configured to sense the orientation of the support component 37 as a rigid body relative to some reference system (such as the ground, or a reference system using the magnetic poles of the Earth) and the information is sent to the computer 22. The computer 22, comprises a program configured to compute the orientation of the support component 37. In particular, the direction of the central axis of the moving apparatus 11 may be determined by the signals of the orientation sensor 91A.

When the proximity sensor 91K detects some objects in its range, the proximity sensor 91K is configured to send a signal to the computer 22. The cameras 91E are configured to capture digital range images of the objects around the vehicle 13, as to detect obstacles. The images captured by the cameras 91E are sent to the computer 22. The computer 22 comprises an image analysis program configured to analyze the images to determine if there are obstacles in the moving path of the vehicle 13.

The first support component 73 of the moving apparatus 11 will be referred to as the support component of the vehicle 13. The central axis of the moving apparatus 11 of the vehicle 13 will be referred to as the central axis of the vehicle 13. The forward moving axis of the moving apparatus 11 of the vehicle 13 will be referred to as the forward moving axis of the vehicle 13. The central axis of a vehicle is always vertical if the vehicle is placed on a horizontal floor; and the forward moving axis is always horizontal if the vehicle is placed on a horizontal floor.

The central axis and the forward moving axis of the vehicle 13 are referred to as the central axis and the forward moving axis of the marked vehicle. The forward moving axis has two directions, and one of the directions is chosen to be the positive moving direction of the vehicle 13, and the other direction is the negative moving direction of the vehicle 13. If the vehicle 13 is placed on a flat floor, then as explained earlier, the first and second drive wheels have the same axis, which is perpendicular to the forward moving axis of the vehicle 13. The rotational direction of the first drive wheel of the vehicle 13 is referred to as the positive rotational direction, if the vehicle 13 moves in the positive moving direction of the vehicle 13 under the following assumptions: (1) the vehicle 13 is placed on a flat floor, (2) the first and second drive wheels are both rotating in the positive rotational direction by the same speed; and (3) slippage between the wheels and the floor is negligible.

It should be noted that the orientation sensor 91A of the vehicle 13 may comprise a fusion sensor comprising a combination of some of the following: accelerometer, gyroscope, magnetometer. The orientation sensor 91A may further comprise an inclination sensor configured to measure the direction of the gravitational direction of the Earth relative to a 3-dimensional coordinate system comprising the central axis and the forward moving axis of the vehicle 13 as two of the three orthogonal axes. The orientation sensor 91A may comprise a geomagnetic orientation sensor. The orientation sensor 91A or the computer 22 may further comprise a filtering program for the computation of the orientation from the signals collected by the devices of the orientation sensor 91A.

Figure 6A:
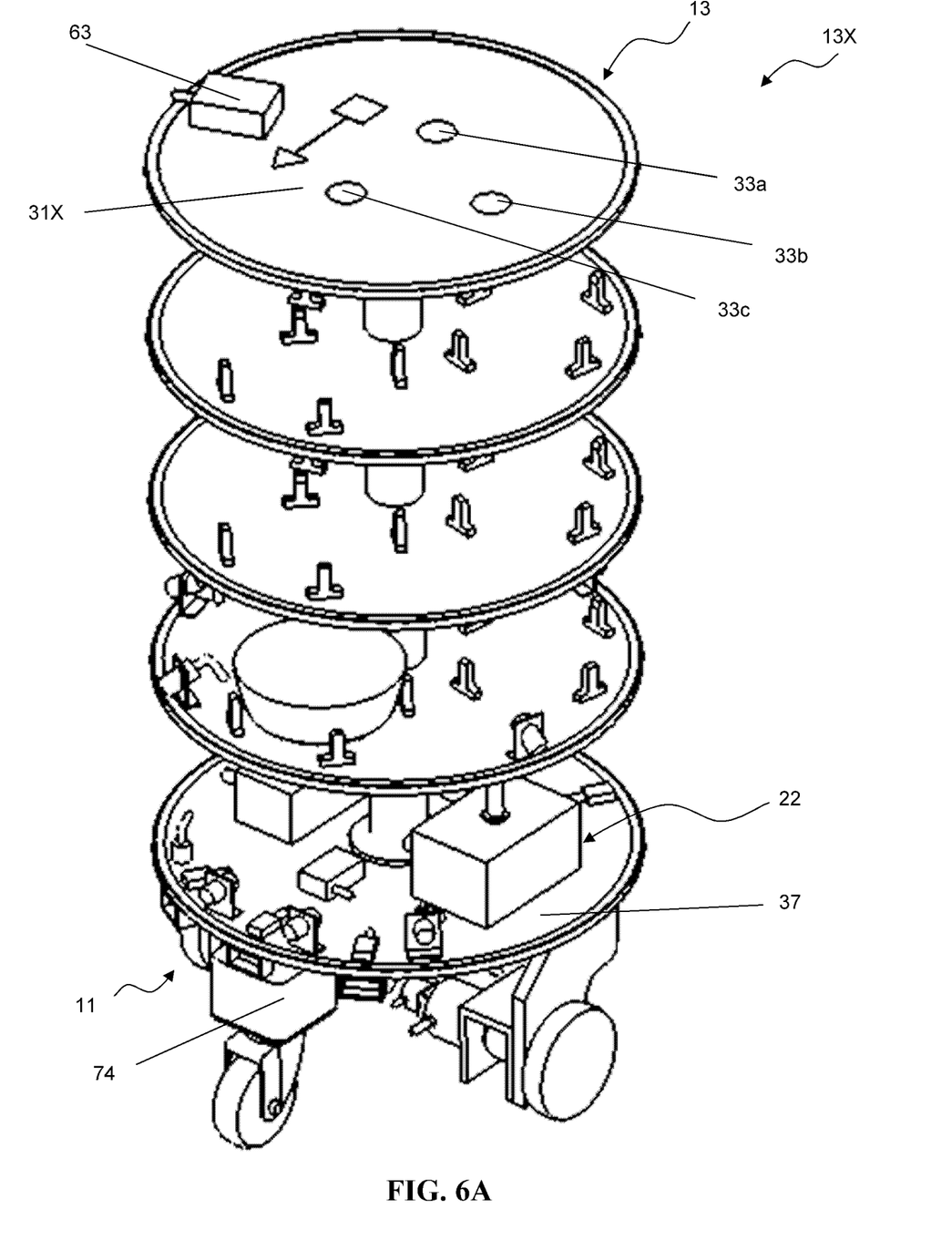
FIG. 6A shows an aerial view of a marked vehicle.

Referring to FIG. 6A, a marked vehicle 13X comprises a vehicle 13 and a marking 31X on the top surface of the flat board 31 of the vehicle body 12 of the vehicle 13. The flat board 31 is configured to be perpendicular to the central axis of the vehicle 13 in our applications. The marking 31X comprises three circles 33a, 33b and 33c which do not overlap with each other, and which do not overlap with other parts of the marking (if any); wherein (the interior of) the circles are each painted in mono-chromatic colors; and the background of the marked surface is configured to be a different monochromatic color. The color of the first circle 33a is referred to as the first color of the marking 31X; the color of the second circle 33b is referred to as the second color of the marking 31X; and the color of the third circle 33c is referred to as the third color of the marking 31X.

Figure 6B:
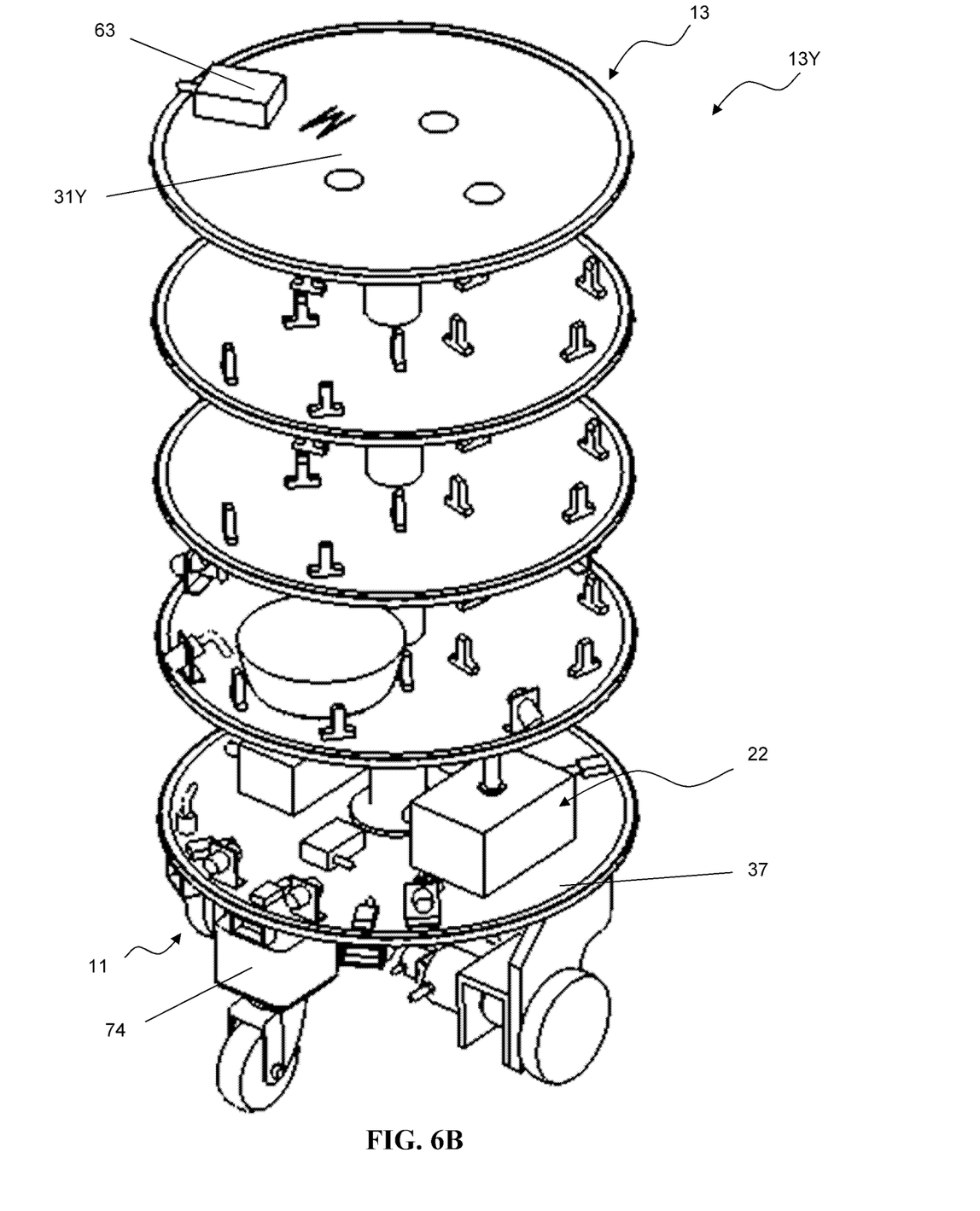
FIG. 6B and FIG. 6C each shows an aerial view of a different marked vehicle.

Referring to FIG. 6B, a marked vehicle 13Y comprises a vehicle 13 and a marking 31Y, wherein the marking 31Y is on the top surface of the flat board 31 of the vehicle 13.

Figure 6C:
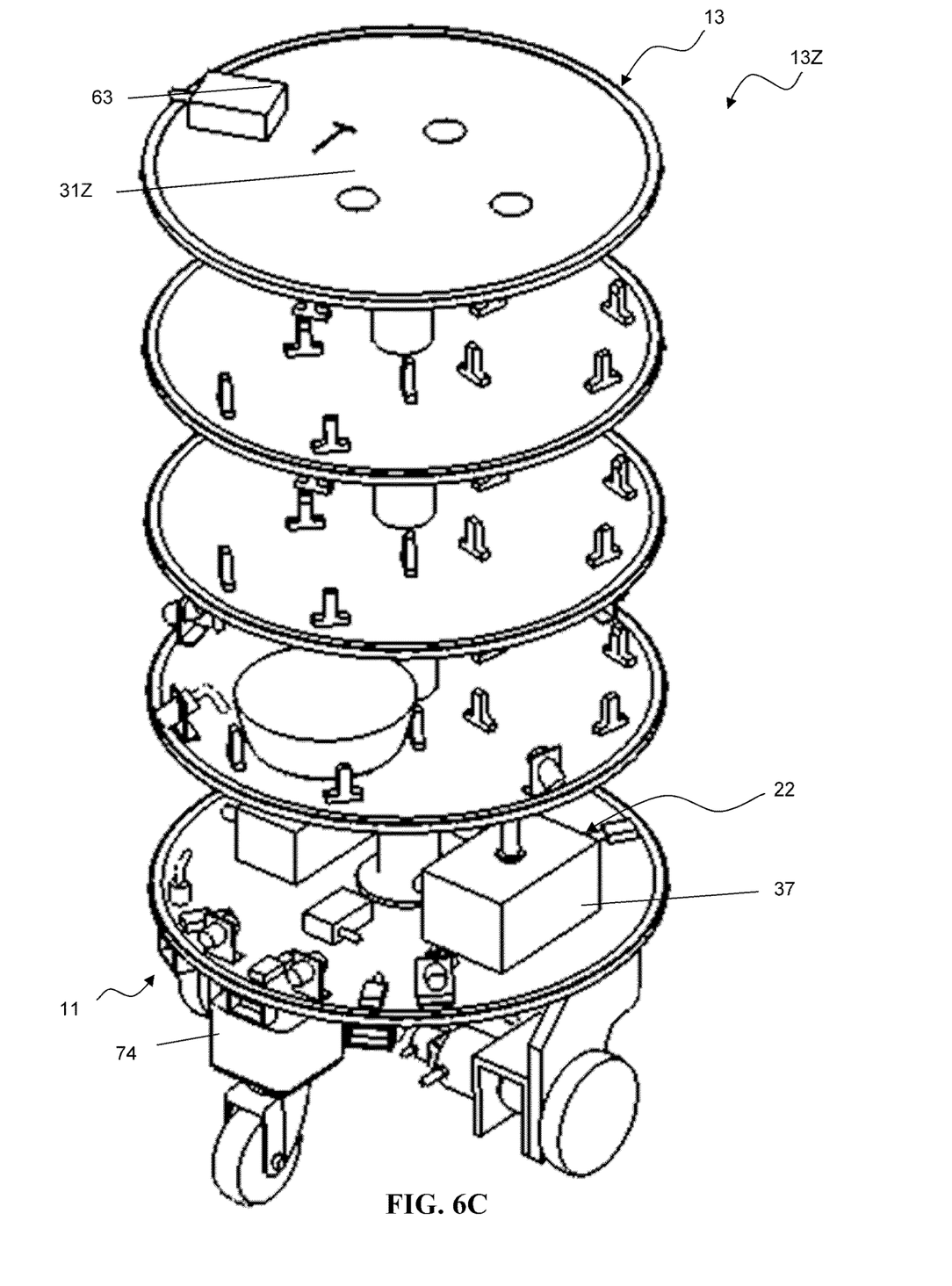

Referring FIG. 6C, a marked vehicle 13Z comprises a vehicle 13 and a marking 31Z, wherein the marking 31Z is on the top surface of the flat board 31 of the vehicle 13.

As in the case of the marking 31Y (or 31Z), this also comprises three mono-chromatic circles in similar locations to the circles 33a, 33b and 33c in the marking 31X. The color of the first circle is referred to as the first color of the marking; the color of the second circle is referred to as the second color of the marking; and the color of the third circle is referred to as the third color of the marking.

For each marked vehicle in our applications, the first color, the second color, the third color of the marked vehicle and the color of the background on the top surface of the flat board 31 of the marked vehicle are configured to be different from each other.

The marking 31X (or 31Y, 31Z) may further comprise a picture or a drawing or a character printed on the surface. The marking may or may not be visible by human eyes. The marking should not have any rotational symmetry. In other words, a rotated image of the marking (by a rotation of an angular degree strictly between 0 and 360 degrees) does not coincide with the marking.

It should be noted that the flat board 31 of a marked vehicle may be substituted by rigid components with a curved surface on the top, and the marking may be printed on the curved surface.

The diameters of the first circle in all markings may be configured to be the same for all marked vehicles; and the position of the first circle on the flat board 31 may be configured to be the same for all vehicles. The same applies to the second circle, or to the third circle of the marked vehicles.

The vehicle body 12 in the vehicle 13 may be substituted by other types of vehicle bodies which may be used to hold other types of containers or to have a seat to sit a human. The vehicle bodies may further comprise windshield glasses, wiper blades, computer displays, doors, windows, etc.

Our vehicle may further comprise other traditional elements such as suspension, shocks, brakes, steering wheels, accelerators, light bulbs, etc.

It should be noted that a motor in the present patent application may be a regular AC or DC motor, a stepper motor, or servo motor, or inverter motor, or variable speed motor, or other types of motor, possibly further comprising speed reducers. The degree of rotation of a motor, or of a shaft, may be further sensed by sensors, including encoders and/or proximity sensors.

It should be noted that the electronic or electric devices, such as radars, lidars, encoders, proximity sensors, infrared sensors, and other types of sensors in the automated vehicle may optionally communicate with the computer via wireless communication.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A support component described in the present patent application can be any type of rigid component; wherein a rigid component is meant to be relatively rigid if ignoring elastic or other small deformations. A support component may be moved relative to another support component or relative to the ground. A rigid component may comprise one or more of the following: a bar, a tube, a beam, a plate, a board, a frame, a structure, a bearing housing, a shaft. A rigid component can be made of metal such as steel or aluminum, or of other materials, or of a combination of several types of materials.

Similarly, a rigid connection is meant to be a connection that is relatively rigid if ignoring elastic or other small deformations.

A wheel in the present patent application always comprises an axis. A drive wheel can be any wheel. The rotation of a drive wheel is often produced by a motor.

For the purpose of the present patent application, a connection between a computer and an electric or electronic device may be a wired connection or a wireless connection. The electric or electronic devices may comprise a motor and the computer may be configured to control the motion of the motor.

Only a few examples and implementations are described. Other implementations, variations, modifications and enhancements to the described examples and implementations may be made without deviating from the spirit of the present invention.

What is claimed is:

1. A vehicle, comprising:
   a computer;
   a first support component;
   a second support component configured to be rotatable around an axis relative to the first support component;
   a first drive wheel configured to be rotatable relative to the first support component;
   a first motor configured to drive the rotation of the first drive wheel relative to the first support component;
   a connection of the computer to the first motor so as to allow the computer to control the first motor;
   a second drive wheel configured to be rotatable relative to the second support component;
   a second motor configured to drive the rotation of the second drive wheel relative to the second support component;
   a connection of the second motor to the computer so as to allow the computer to control the second motor;
   wherein the axis of the first drive wheel and the axis of the second drive wheel are configured to be parallel if the vehicle is placed on a horizontal floor and if the first drive wheel and the second drive wheel both touch the horizontal floor;
   wherein the axis of the first drive wheel and the axis of the second drive wheel are configured to be both relatively near a vertical plane in the sense that the distance from any point of either axis to said vertical plane is less than 15% of the distance between the first drive wheel and the second drive wheel if the vehicle is placed on a horizontal floor and if the first drive wheel and the second drive wheel both touch the horizontal floor;
   wherein the axis of the second drive wheel is configured to be non-parallel to the axis of rotation of the second support component relative to the first support component;
   wherein the axis of the first drive wheel is configured to be non-parallel to the axis of rotation of the second support component relative to the first support component.

2. The vehicle of claim 1, wherein the radius of the first drive wheel is the same as the radius of the second drive wheel.

3. The vehicle of claim 1, further comprising a first universal wheel device comprising:
   a rotatable component configured to be constrained to rotate relative to the first support component; and
   a wheel configured to be constrained to rotate relative to said rotatable component;
   wherein the axis of rotation between said rotatable component and the first support component is perpendicular and not coplanar with the axis of rotation between the wheel and said rotatable component.

4. The vehicle of claim 3, further comprising a second universal wheel device comprising:
   a rotatable component configured to be constrained to rotate relative to the second support component; and
   a wheel configured to be rotatable relative to said rotatable component;
   wherein the axis of rotation between said rotatable component and the second support component is perpendicular and not coplanar with the axis of rotation between the wheel and said rotatable component.

5. The vehicle of claim 4, wherein the axis of rotation of the rotatable component of the first universal wheel device relative to the first support component and the axis of rotation of the rotatable component of the second universal wheel device relative to the second support component are configured to be contained in a vertical plane if the vehicle is placed on a horizontal floor and if the first drive wheel and the second drive wheel both touch the floor, said vertical plane being perpendicular to the axis of the first drive wheel and the first drive wheel and the second drive wheel being positioned on the opposite sides of said vertical plane.

6. The vehicle of claim 4, wherein the axis of rotation between the rotatable component of the first universal wheel device and the first support component is configured to be vertical if the vehicle is placed on a horizontal floor and if the first drive wheel and the second drive wheel both touch the horizontal floor, wherein the axis of rotation between the rotatable component of the second universal wheel device and the second support component is configured to be vertical if the vehicle is placed on a horizontal floor and if the first drive wheel and the second drive wheel both touch the horizontal floor.

7. The vehicle of claim 1, further comprising a pair of wheels, said pair of wheels being positioned on opposite sides of the vertical plane through the axis of the first drive wheel if the vehicle is placed on a horizontal floor and if the first drive wheel and the second drive wheel both touch the horizontal floor.

8. The vehicle of claim 1, wherein the axis of the first drive wheel and the axis of the second drive wheel are configured to be the same if the vehicle is placed on a horizontal floor and if the first drive wheel and the second drive wheel both touch the horizontal floor.

9. The vehicle of claim 1, wherein the axis of the first drive wheel and the axis of the second drive wheel are configured to be parallel if the vehicle is placed on a horizontal floor and if the first drive wheel and the second drive wheel both touch the horizontal floor.

10. The vehicle of claim 1, wherein the first motor and second motor are configured to be stepper motors.

11. The vehicle of claim 1, further comprising:
a first encoder and a second encoder, each configured to be connected to said computer, wherein the first encoder is configured to directly or indirectly detect the angle change in the rotation produced by the first motor, wherein the second encoder is configured to directly or indirectly detect the angle change in the rotation produced by the second motor.

12. The vehicle of claim 1, further comprising a surface with a marking.

13. The vehicle of claim 1, further comprising an orientation sensor configured to detect the orientation of the first support component, said sensor being configured to be connected to the computer.

14. The vehicle of claim 1, further comprising one or more proximity sensors, each configured to detect obstacles in the next movement path of the vehicle, said proximity sensor being configured to be connected to the computer.

15. The vehicle of claim 1, further comprising one or more digital cameras, and a connection of each camera to the computer.

16. The vehicle of claim 1, further comprising one or more laminators.

17. A vehicle comprising:
a computer;
a first support component;
a second support component configured to be rotatable around an axis relative to the first support component;
a first drive wheel configured to be rotatable relative to the first support component;
a first motor configured to drive the rotation of the first drive wheel relative to the first support component;
a connection of the computer to the first motor so as to allow the computer to control the first motor;
a second drive wheel configured to be rotatable relative to the second support component;
a second motor configured to drive the rotation of the second drive wheel relative to the second support component;
a connection of the second motor to the computer so as to allow the computer to control the second motor;
wherein the axis of the first drive wheel and the axis of the second drive wheel are configured to be contained in a vertical plane if the vehicle is placed on a horizontal floor and if the first drive wheel and the second drive wheel both touch the horizontal floor;
wherein the axis of the second drive wheel is configured to be non-parallel to the axis of rotation of the second support component relative to the first support component
wherein the axis of the first drive wheel is configured to be non-parallel to the axis of rotation of the second support component relative to the first support component.

18. The vehicle of claim 17, wherein the axis of the first drive wheel and the axis of the second drive wheel are configured to be parallel if the vehicle is placed on a horizontal floor and if the first drive wheel and the second drive wheel both touch the horizontal floor.

19. The vehicle of claim 17, wherein the axis of the first drive wheel and the axis of the second drive wheel are configured to coincide if the vehicle is placed on a horizontal floor and if the first drive wheel and the second drive wheel both touch the horizontal floor.

20. A vehicle, comprising:
a computer;
a first support component;
a second support component configured to be rotatable around an axis relative to the first support component;
a first drive wheel configured to be rotatable relative to the first support component;
a first motor configured to drive the rotation of the first drive wheel relative to the first support component;
a connection of the computer to the first motor so as to allow the computer to control the first motor;
a second drive wheel configured to be rotatable relative to the second support component;
a second motor configured to drive the rotation of the second drive wheel relative to the second support component;
a connection of the second motor to the computer so as to allow the computer to control the second motor;
wherein the axis of the first drive wheel and the axis of the second drive wheel are configured to be parallel if the vehicle is placed on a horizontal floor and if the first drive wheel and the second drive wheel both touch the horizontal floor;
wherein the axis of the second drive wheel is configured to be non-parallel to the axis of rotation of the second support component relative to the first support component;
wherein the axis of the first drive wheel is configured to be non-parallel to the axis of rotation of the second support component relative to the first support component;
wherein the vehicle further comprises a pair of wheels, said pair of wheels being positioned on opposite sides of the vertical plane through the axis of the first drive wheel if the vehicle is placed on a horizontal floor and if the first drive wheel and the second drive wheel both touch the horizontal floor.

* * * * *